Patented Nov. 14, 1922.

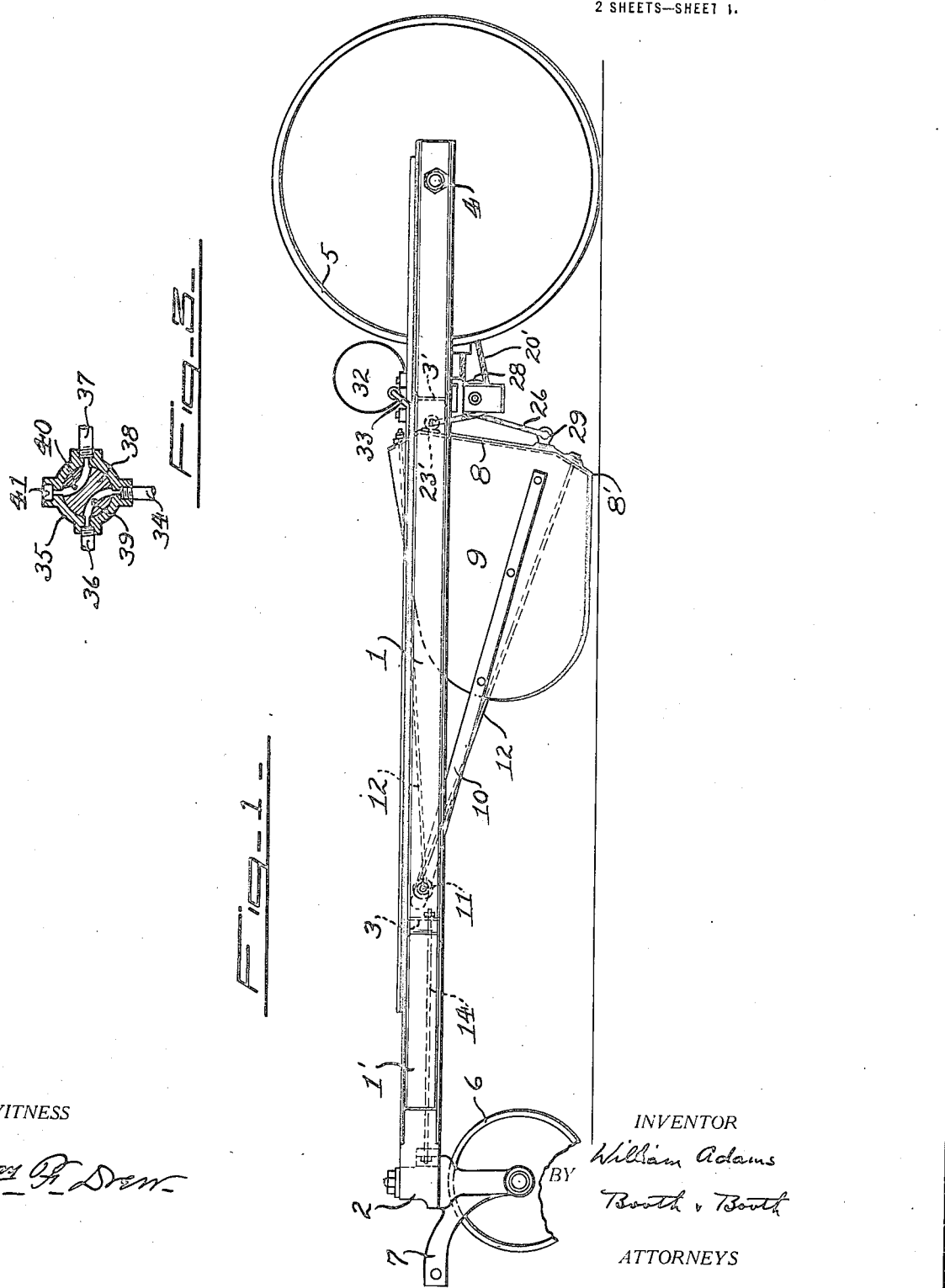

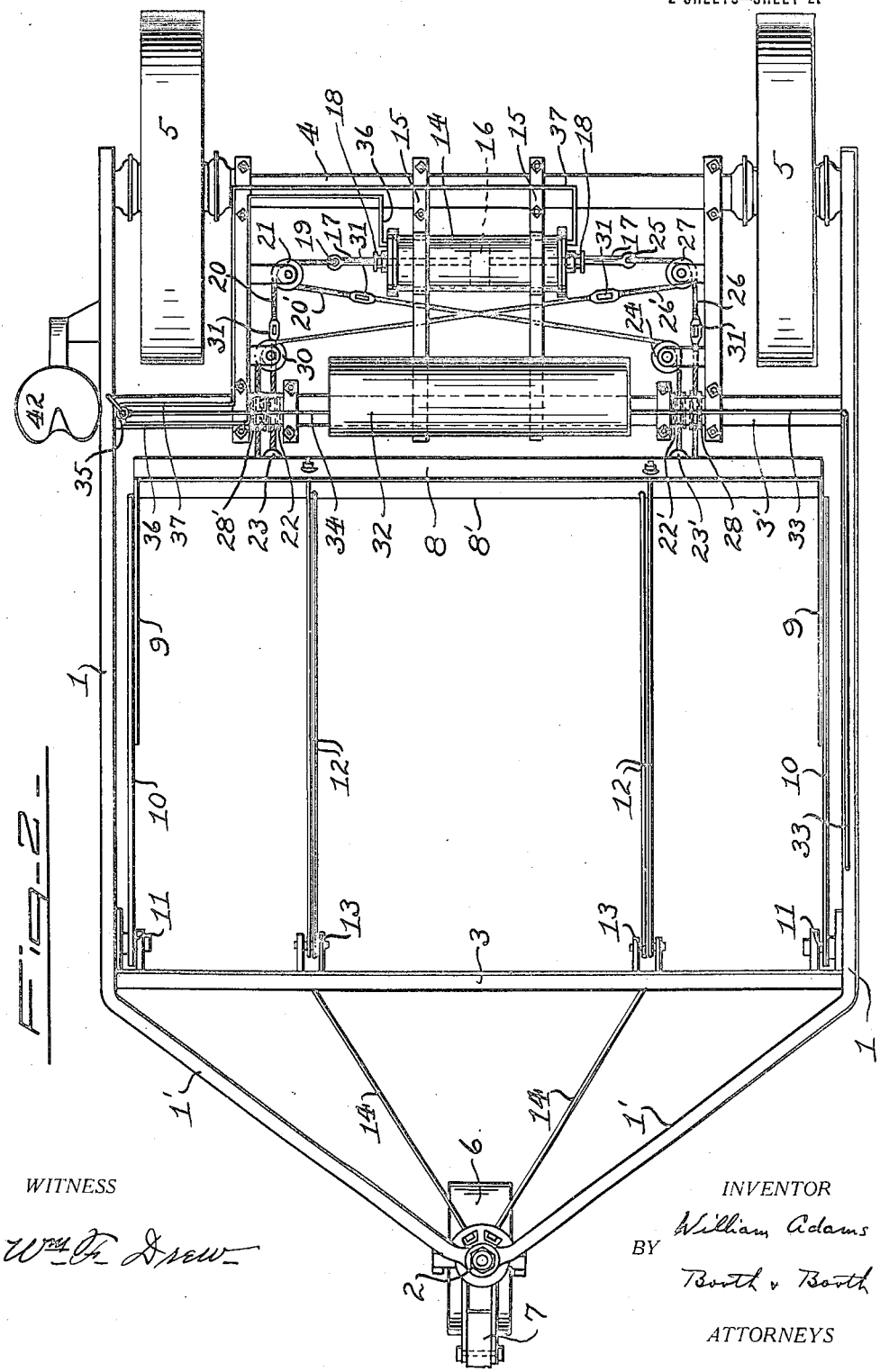

1,435,575

UNITED STATES PATENT OFFICE.

WILLIAM ADAMS, OF STOCKTON, CALIFORNIA.

FLUID-CONTROLLED LAND LEVELER.

Application filed July 21, 1921. Serial No. 486,423.

*To all whom it may concern:*

Be it known that I, WILLIAM ADAMS, a citizen of the United States, residing at Stockton, in the county of San Joaquin and State of California, have invented certain new and useful Improvements in Fluid-Controlled Land Levelers, of which the following is a specification.

My invention relates to earth-moving implements adapted for leveling and scraping the surface of the ground.

The objects of my invention are to provide, in a land-leveler having an adjustable scraper blade set at right angles to the direction of travel and adapted to scrape and push before it the loosened earth, a frame construction capable of providing sufficient rigidity for the blade without interfering with its adjustability, and further to provide simple and easily controlled power means for adjusting the blade to any desired height. This adjusting means, in the present invention, is preferably operated by fluid pressure devices.

My invention will be hereinafter fully described with reference to the accompanying drawings, wherein:

Fig. 1 is a side elevation of my land-leveler.

Fig. 2 is a plan view of the same.

Fig. 3 is a sectional detail, enlarged, of the fluid-controlled valve.

In the drawings the reference numeral 1 designates the side members of a main frame, whose forward end portions 1' converge and are secured to a control bracket 2. Cross members 3 and 3' hold said sidemembers 1 in spaced relation. An axle 4 extends across between the rear end portions of said frame members 1, and has supporting wheels 5 journalled upon it. A front caster wheel 6 is provided for supporting the forward end of the frame, said wheel being carried in a suitable draft head 7 pivotally mounted in the forward frame bracket 2.

The scraper consists of a transversely disposed blade 8, substantially vertically disposed, and preferably formed as shown in the drawings. The scraper has no bottom, the scraping or cutting being done by the lower edge 8' of the blade 8. Forwardly extending end guards 9 are provided, and to them are fixed draft bars 10, which extend forwardly and are pivotally connected at 11 with the forward frame cross members 3. The center portion of the blade 8 is strengthened and supported by draft rods 12, pivoted at 13 in transverse alignment with the pivotal connections 11 of the side draft bars 10. Suitably disposed tension members 14 are provided for bracing the forward frame cross member 3. In the drawings I have shown four draft rods 12, arranged in pairs as shown, but it should be understood that the number and arrangement of these are merely matters of structural practicability and convenience.

It should be noted that the scraper blade 8 is substantially supported by the pivotally connected draft bars 10 and rods 12, and at the same time is capable of free vertical movement for adjustment.

The vertical adjustment of said scraper blade is accomplished by means of a horizontally disposed fluid pressure cylinder 14, Fig. 2, suitably mounted upon supports 15, and having a piston 16 to which is secured a piston rod 17 extending entirely through the cylinder and projecting from both ends thereof passing through stuffing boxes 18. One end of said piston rod is connected, at 19, with a pair of flexible cables 20 and 20', which pass over a double sheave 21 and then separate, one of said cables, 20, being led directly under a sheave 22 and connected with the upper portion of the scraper blade 8 at 23, and the other cable, 20', being led diagonally across the machine, behind a sheave 24, and under a sheave 22' and connected with the upper portion of the blade at 23', Figs. 1 and 2.

The other end of the piston rod 17 is connected, at 25, Fig. 2 with a pair of cables 26 and 26', similar but disposed oppositely to the cables 20 and 20'. The cable 26 is led over a double sheave 27, and thence over a sheave 28 and connected with the lower portion of the blade 8 at 29, Fig. 1. The cable 26' after passing over the double sheave 27, Fig. 2, is led diagonally across the machine, behind a sheave 30, over a sheave 28′, and connected with the lower portion of the blade at a point not shown in the drawings, but which corresponds to and is directly behind the point 29 of Fig. 1.

It will be seen that by this arrangement, the movement of the piston 16 in one direction lowers the scraper blade 8, by means of the cables 20 and 20′, and movement of said piston in the other direction raises said blade by means of cables 26 and 26′. Turn buckles 31 are preferably inserted in all the cables for the purpose of taking up slack.

In the preferred form of the machine illustrated herewith I have shown the flexible members 20, 20′, 26, and 26′ as cables, and have so described them, but it is obvious that these members may be chains or ropes; likewise, although I have illustrated and described two such cables connected with each end of the piston rod 17, it will be apparent that any desired number may be used, depending upon the size and construction of the machine.

A fluid receiver 32, Figs. 1 and 2, is provided, and is adapted to be supplied with fluid under pressure, through a pipe 33, from any convenient source not shown in the drawings. In practice, when the land-leveler is drawn by a tractor, air may be supplied to the receiver 32 from a compressor located on the tractor, but this forms no part of the present invention and is therefore not illustrated in the drawings. From the receiver 32 a pipe 34, Fig. 2, leads to a four-way valve 35, from which pipes 36 and 37 lead respectively to the two ends of the cylinder 14, so that, by the operation of said valve, the piston 16 may be caused to move in either direction.

The control valve 35 is illustrated in detail in Fig. 3 of the drawings, wherein 38 is the movable plug of said valve, which is provided with separate passages 39 and 40. In the position shown, fluid under pressure is admitted from the supply pipe 34 to the pipe 36, while the pressure in the pipe 37 is permitted to escape through an outlet 41. A quarter turn of the plug 38 reverses these connections in the usual well known manner.

The fluid control valve 35 is preferably located in convenient proximity to an operator's seat 42, Fig. 2.

The fluid pressure devices above described provide simple and easily controlled means for raising and lowering the scraper blade, and cannot be rendered inoperative by any possible distortion of the frame or scraper due to uneven ground or heavy work. Moreover, the mounting of the blade itself provides ample support therefor without interfering with its free up and down movement

I claim:

1. A land-leveler comprising a substantially rectangular frame with spaced side-members and cross-members; a wheeled-axle carried by the rear ends of the side members; a vertically adjustable scraper-blade with end guards, disposed between the side-members forward of the rear cross-member; draft bars rigidly connected at their rear ends with the end guards of the scraper blade and pivotally connected at their forward ends with the forward cross-member; a pair of draft rods, the rear ends of the members of said pair being rigidly connected at different elevations with the scraper blade, and their forward ends pivotally connected with the forward cross member in the horizontal plane of the pivotal connections of the draft bars with said member; and means carried by the frame rearwardly of the scraper blade for vertically adjusting said blade.

2. A land-leveler comprising a substantially rectangular frame with spaced side-members and cross-members; a wheeled-axle carried by the rear ends of the side members; a vertically adjustable scraper-blade with end guards, disposed between the side-members forward of the rear cross-member; draft bars rigidly connected at their rear ends with the end guards of the scraper blade and pivotally connected at their forward ends with the forward cross-member; a pair of draft rods, the rear ends of the members of said pair being rigidly connected at different elevations with the scraper blade, and their forward ends pivotally connected with the forward cross member in the horizontal plane of the pivotal connections of the draft bars with said member; a cable connected with the scraper blade near its lower portion; a cable connected with said blade near its upper portion; and means for simultaneously operating and controlling said cables in relatively opposite directions to positively raise and depress the blade.

3. A land-leveler comprising a frame; a scraper blade; links pivotally connecting said blade with the front of the frame, adapting it for vertical adjustment; a cable connected with the scraper-blade near its lower portion; a cable connected with said blade near its upper portion; and means for simultaneously operating and controlling said cables in relatively opposite directions to raise and depress the blade.

4. A land-leveler comprising a frame; a scraper blade; links pivotally connecting said blade with the front of the frame, adapting it for vertical adjustment; an operating member carried by the frame and movable transversely thereof; a pair of cables connected with one end of said operating member, one of said cables being directed to and connected with the upper portion of the back of said blade near the adjacent end thereof and the other of said cables being directed to and connected with the upper portion of the back of said blade near its other end; and a second pair of cables connected with the other end of said operating member, one of said cables being directed to and connected with the lower portion of the back of the scraper blade near the adjacent end thereof, and the other of said cables being directed to and connected with the lower portion of the back of said blade near its other end.

In testimony whereof I have signed my name to this specification.

WILLIAM ADAMS.